June 3, 1952 J. X. BRIXIUS ET AL 2,598,673
HIGH-CAPACITY OIL BATH FILTER
Filed June 20, 1947 2 SHEETS—SHEET 1
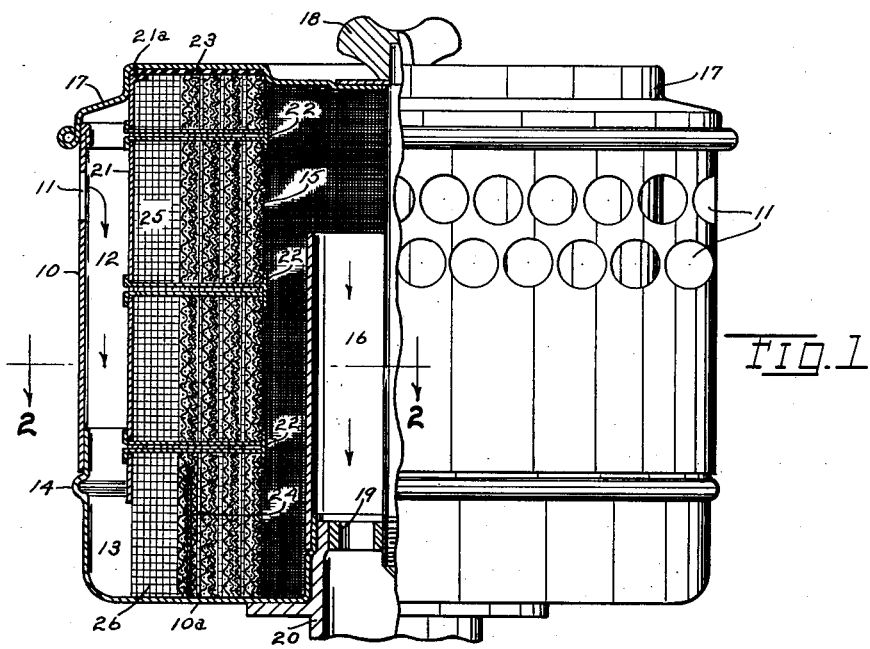
FIG.1
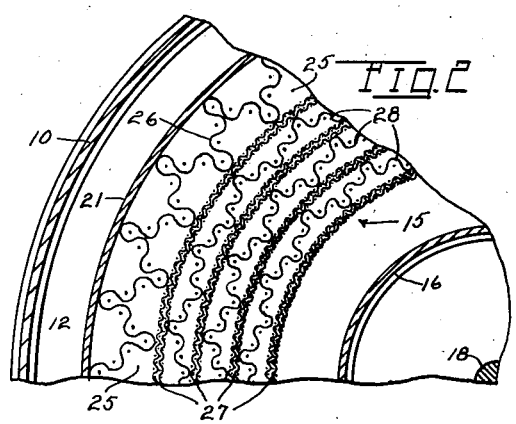
FIG.2
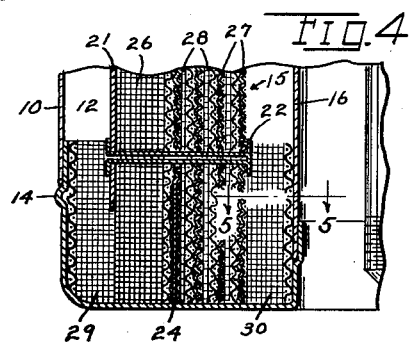
FIG.4
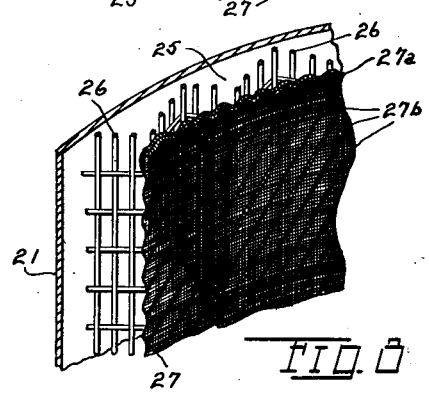
FIG.3
FIG.5
INVENTORS
JACOB K. BRIXIUS
ROBERT GORDEN HANNEMAN
BY Hyde, Meyer, Baldwin & Doran
ATTORNEYS June 3, 1952  J. X. BRIXIUS ET AL  2,598,673
HIGH-CAPACITY OIL BATH FILTER
Filed June 20, 1947  2 SHEETS—SHEET 2

INVENTORS
JACOB K. BRIXIUS
ROBERT GORDEN HANNEMAN
By Hyde, Meyer, Baldwin & Doran
ATTORNEYS Patented June 3, 1952

2,598,673

UNITED STATES PATENT OFFICE 2,598,673

HIGH-CAPACITY OIL BATH FILTER

Jacob K. Brixius and Robert Gorden Hanneman, Cleveland, Ohio, assignors to Air-Maze Corporation, Cleveland, Ohio, a corporation of Delaware Application June 20, 1947, Serial No. 756,014

7 Claims. (Cl. 183—15)

This invention relates to improvements in an oil bath filter, and more particularly to structural arrangements whereby to provide a great increase in capacity over similar devices of the prior art.

The present application is a continuation in part of our copending application Serial No. 729,002, filed February 17, 1947, now abandoned.

An object of the present invention is to provide means for evenly distributing the oil or other cleansing liquid utilized in a bath-type filter for maintaining the filter element continually in a clean condition.

Another object of the present invention is to provide means outside the filter element proper, but closely adjacent thereto, for breaking up oil or other cleansing liquid carried from a bath toward a filter element without substantially increasing the resistance of the filter apparatus generally to the passage of a gaseous stream.

Another object of the present invention is to utilize the oil break-up means as a fastening device for assembling the filter element in its housing.

Another object of the present invention is to provide a filter element structure whereby oil globules passing through or tending to pass through the filter element are broken up and redistributed several times so as to oppose the tendency of oil globules to pass entirely through the filter element.

Another object of the present invention is to provide novel means in conjunction with the filter mentioned in the preceding paragraphs to prevent spilling and splashing of the oil or other cleaning liquid contained in the bath portion of the filter.

Other objects and advantages of our invention will be apparent from the accompanying drawings and description and the essential features will be set forth in the appended claims.

In the drawings,

Fig. 1 is a view showing one embodiment of our improved filter wherein the right-hand half shows the device in side elevation while the left-hand half shows a central sectional view;

Fig. 2 is a fragmental sectional view enlarged taken along the line 2—2 of Fig. 1;

Fig. 3 is a perspective view of the outermost portion of the screen construction shown in Figs. 1 and 2;

Fig. 4 is a sectional view similar to the lower left-hand portion of Fig. 1 and illustrating a modified form of our device;

Fig. 5 is a fragmental sectional view enlarged taken along the line 5—5 of Fig. 4;

Fig. 6 is a view similar to Fig. 1 showing a modified form of our device; while

Figure 6:
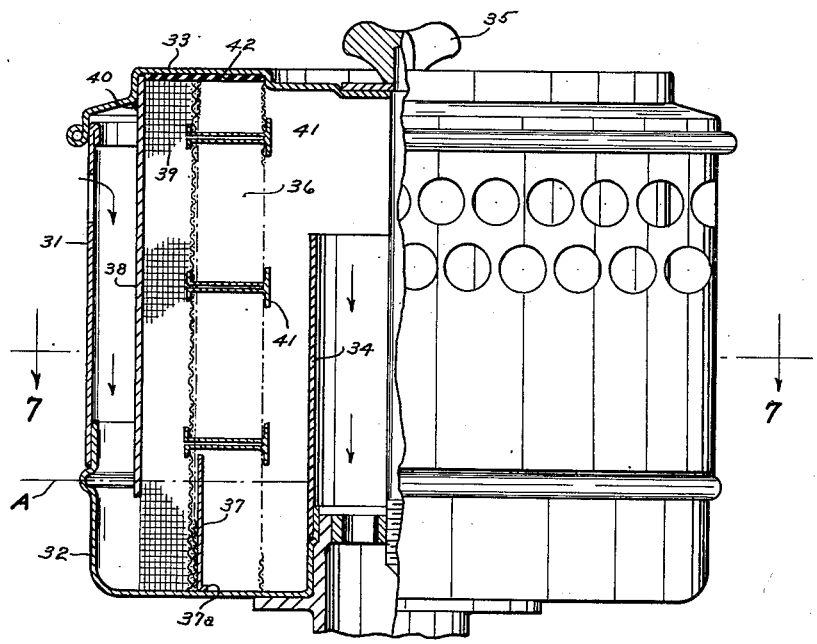

Our invention is an improvement over the type of filter shown in United States Patent No. 1,876,368, granted September 6, 1932, to George M. Walton, or as shown in United States Patent No. 2,377,142, granted May 29, 1945, to Clarence J. Glanzer. Liquid bath filters of the type described and as shown in the Walton and Glanzer patents mentioned above are commonly used for the air intake of internal combustion engines. For such use, the filter elements must be so designed that the air passing through the element does not attain a face velocity through the filter element beyond a certain predetermined limit or oil globules will be carried from the liquid bath in the lower outer portion of the filter upwardly and through the filter element to the outlet, whence the oil particles will travel to the engine intake. Obviously, such pullover of oil is undesirable and the filters have a definite limited capacity. The present invention so improves the action of these prior known filters that the air velocity permissible through the filter element without oil pullover may be more than doubled.

As shown in Figs. 1, 2 and 3, an outer chamber or housing 10 is provided with air inlet openings 11 through which air enters and passes downwardly through an annular chamber 12 and into and through an oil bath 13 which exists in the bottom of the container, preferably about to the level of the bead 14. The oil and air then pass upwardly through a filter element 15 and the clean air is finally discharged downwardly through the tube 16. The entire unit is closed at the top by means of a cover 17 held in place by a thumb screw or bolt 18 which is threaded into a spider 19 which forms part of a bracket 20 which leads to the engine intake. A cylindrical skirt 21 is permanently secured to the filter element 15 by any suitable means such as the rivets 22. A gasket 23 provides a seal between the filter element and the cover 17. Preferably, the skirt 21 extends slightly below the oil level 14, as clearly shown in Fig. 1 so that the air is compelled to pass through the oil on its way to the filter element. A cylindrical sheet of metal or foil 24 forms a portion of the filter element near the bottom thereof and preferably extends slightly above the bottom of skirt 21, as clearly shown in Fig. 1, forming a baffle ring so as to compel the incoming air stream to pass upwardly after it goes under the skirt 21. Prior devices of the type shown in the above-mentioned Glanzer patent have caused the entering air stream to pick up oil or similar cleansing liquid in the bath 13 which is then thrown upwardly with great violence in the annular chamber 25 between the outer wall of the filter element proper and the skirt 21. Much of this oil has been thrown clear to the top cover 17 resulting in a concentration of oil globules near the top of the filter element.

Prior devices have caused oil globules to pull over to the interior of the filter element. The present invention breaks up these oil globules into small particles so that they are more evenly distributed over the outer face of the filter element 15. Any material placed in the annular chamber 25 for this purpose must be very carefully chosen, or it will so restrict the flow of air through the filter device as to render it undesirable for use in the suction line leading to an internal combustion engine. We have found that a single layer 26 of what is known to industry as hardware cloth having a very open weave of the order of three or four wires per inch will satisfactorily perform this function. The wires of which this hardware cloth is woven are approximately .035 inch in diameter and when woven with three meshes to the inch in each direction, vertically and horizontally, and crimped in a zig-zag manner as shown in Figs. 2 and 3, will provide a limited number of wires in the annular chamber 25 which are sufficient to break up the oil globules and distribute them evenly over the outer face of the filter element 15 but without greatly increasing the resistance of the filter to air flow.

After the oil is evenly distributed over the outer face of the filter element 15, we prefer to provide an internal construction of this filter element which minimizes the chance for oil globules to pass radially inwardly through the filter element in the undesirable manner mentioned above which produces what is known as oil "pullover." This construction is shown in conventional manner in Figs. 1, 2 and 3. Upon leaving the annular chamber 25, as the air stream passes radially inwardly through the filter element 15 it first strikes a layer 27 of relatively fine screen preferably formed as more clearly shown in Fig. 3, by folding double a sheet of 16 x 16 wire screen shown in Fig. 3 doubled along its upper edge 27a. After doubling, this screen is preferably given crimps or slight corrugations approximately 3/32 inch to 1/16 inch deep, as indicated at 27b. The crimping is done after the sheet is folded double so that the crimps or corrugations nest with each other and therefore, the resultant double layer provides openings that are smaller than sixteen to the inch. Radially inward from the layer 27 is a layer 28 of relatively coarse wire screen, say for instance 3 x 3 hardware cloth mentioned previously in connection with the layer 26. This separating layer 28 has shallow parallel crimps or corrugations extending from top to bottom of the sheet, these crimps being approximately 3/32 inch to 1/4 inch in radial depth. The layers 27 and 28 are repeated a plurality of times, as clearly indicated in Figs. 1 and 2 where we have shown four of the layers 27 separated by three of the layers 28, thus providing an innermost layer 27 of the same construction as the outermost layer 27.

It results from the above construction that a very efficient cleaning action of the air stream is provided together with even distribution of the washing liquid such as oil, but minimizing the danger that oil will be carried entirely through the filter element to the discharge outlet 16. We believe the reason for this action is that in each layer 27 the screen wires are substantially evenly coated with oil and the air passing through the fine interstices deposits its dust upon the screen wires. Upon emerging into the separating layer 28 there is practically no obstruction to the air stream so that an equalization is permitted before the air stream strikes the next layer 27 inward. In other words, if localized air pressure spots have developed in the outermost layer 27, an equalizing chamber is provided to diffuse the air stream before it strikes the next layer 27. In like manner, if a localized oil concentration has developed in the outer layer 27 this oil is sprayed through the coarse screen 28 across an air gap so as to spread the oil before it hits the next layer 27. This action is repeated as the stream progresses radially inward through the filter element 15. A minimum of oil will be carried to the innermost layer 27 and this being a fine screen layer will stop the last particles of oil which will drain downward to the oil bath 13.

No oil or unfiltered air can by-pass the filter element 15 at the top because of the gasket 23 which contacts the upper edges of all of the screen layers and at its outer periphery closely engages the radially inturned flange 21a of the skirt 21. This flange also stiffens the cylindrical skirt 21 at the top thereof.

No by-passing of the filter element 15 is possible at the bottom thereof because the foil or metal barrier 24 extends to the bottom 10a of the housing and sufficient oil is always present at this location to prevent by-passing of the air.

The construction just described is easily disassembled when it is desired to clean the filter. Removal of the bolt 18 permits the lifting of cover 17 after which the unit comprising the skirt 21, the filter element 15 and the diffuser screen 26 (held together by the rivets 22) is readily removed. It will be understood by those skilled in this art that this unitary construction of a large number of generally cylindrical screen layers and the outer cylindrical skirt 21 provides a very strong construction upon which a heavy person may stand without deforming the same. Trouble has been experienced in prior constructions where a drawing down of the bolt 18 has caused deformation of cylindrical filter elements in prior oil bath filters of this general type.

A modification is shown in Figs. 4 and 5 which is in all respects like that described in Figs. 1, 2 and 3, except that layers 29 and 30 radially outside and inside respectively, of the filter element 15 have been provided. This construction is adopted where the filter is subject to shaking and vibration which might cause the oil to splash out of the filter. To minimize such splashing, layers 29 and 30 are provided, one of these being shown in detail in Fig. 5. This layer is preferably 3 x 3 hardware cloth as mentioned previously, but folded in rather tight crimps in zig-zag formation so as to fill a considerable portion of the space radially inwardly of the filter element 15 near the bottom of the filter. It is desirable that the layer 30 substantially touch the discharge tube 16 on the inside, and layer 27 of the filter element at the outside. The layer 29 is the like layer 30 consisting of 3 x 3 hardware cloth or equivalent, folded in zig-zag form and squeezed relatively close together so as to substantially fill the annular space between screen layer 26 and the outer cylindrical wall of the main housing up to and preferably slightly above the oil level bead 14.

Figure 7:
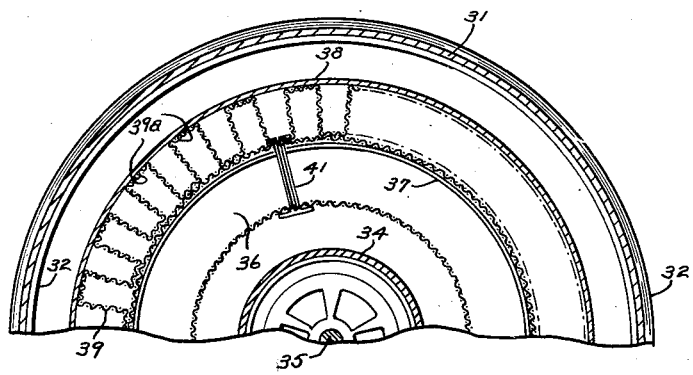
Fig. 7 is a transverse sectional view taken along the line 7—7 of Fig. 6.

In the modification of Figs. 6 and 7 we have shown how the single layer of stiff hardware cloth outside of the filter element proper may be utilized to perform a second function in the assembly of the parts. Here the filter housing parts 31 and 32 are the like the parts 10 and 10a previously described. The cover 33 is like the cover 17, the outlet pipe 34 is like the pipe 16 and the parts are held together by a thumb bolt 35 similar to 18. The annular filter element 36 may be constructed like the element 15 already described and the drawings have been simplified by eliminating the details of this filter element. The baffle ring 37 which extends entirely around the filter element near the bottom may be exactly like the baffle ring 24 previously mentioned or it may be made of a hard felt material substantially impervious to the ready flow of oil and folded over slightly on the bottom housing member 32 as indicated at 37a to give a good seal at this point. The chief difference between this modification and that previously described consists in the arrangement and assembly of the skirt 38 and the hardware cloth layer 39. The skirt 38 is here shown as secured to the top 33 as by spot welding at the point 40. The hardware cloth layer 39 is quite similar to the layer 26 previously described. In Fig. 7 we have shown how the corrugations of the hardware cloth may be slightly flattened along their outermost portions 39a for a purpose which will presently appear. The outermost periphery of the hardware cloth layer is adapted to frictionally engage the inner face of the cylindrical skirt 38 sufficiently to frictionally hold the same in the assembled position shown in Fig. 6. Securing members 41 pass through the filter element 36 and into the hardware cloth layer 39 so as to make a unitary assembly of these parts.

It results from the construction of the preceding paragraph that when the top 33 is separated from the housings 31, 32 the unit consisting of the parts 36 and 39 is pushed up inside the skirt 38 against an annular gasket seal 42. There is sufficient resiliency in the hardware cloth layer 39 to provide a strong frictional engagement between the hardware cloth and the skirt 38 so that the parts are normally held together but may be separated by a strong pull. The hardware cloth layer 39 fulfills, in the modification of Figs. 6 and 7, the same functions recited with the respect to the hardware cloth layer 26 described in connection with the first modification while at the same time performing its function in assembling the parts in the novel manner just disclosed. When the user desires to disassemble the device of Fig. 6 he loosens the thumb bolt 35 and removes the top 33 which brings away with it the skirt 38 and the parts 39 and 36. If his purpose is merely to clean out the bowl portion 32 of the housing and renew the oil to the level A he need not disassemble the parts secured to the cover, but may easily replace them exactly as they were removed. If, however, he desires to inspect or clean the portions 39 and 36 he may then pull these parts away from the skirt 38 with a strong pull.

What we claim is:

1. In a liquid bath filter having a housing for holding a washing liquid bath in the bottom thereof, having a cylindrical outer wall of said housing and a cylindrical skirt spaced inwardly therefrom providing an annular air inlet chamber directing air into said bath, there being air inlet means near the top of said chamber, having an annular filter element spaced inwardly from said skirt providing an annular air uptake chamber between said skirt and element and providing an air discharge chamber centrally of said element, having means for discharging air out of the upper portion of said discharge chamber, and having a top and baffle means compelling flow of air downwardly in said air inlet chamber, through said bath where it picks up liquid, upwardly in said uptake chamber and radially inwardly through said filter element; the combination therewith of said skirt extending substantially to the top level of said bath, and a limited number of bodies of a filamentary character substantially evenly spaced in said uptake chamber, said bodies being of a size and number to thoroughly break up liquid globules carried out of said bath while not appreciably increasing the resistance to air flow through said filter, said baffle means including a substantially imperforate baffle ring extending from the bottom of said liquid bath to a level above said bath, said baffle ring having a diameter close to the outside diameter of said annular filter element, and said filamentary bodies substantially filling said annular uptake chamber.

2. In a liquid bath filter having a housing for holding a washing liquid bath in the bottom thereof, having a cylindrical outer wall of said housing and a cylindrical skirt spaced inwardly therefrom providing an annular air inlet chamber directing air into said bath, there being air inlet means near the top of said chamber, having an annular filter element spaced inwardly from said skirt providing an annular air uptake chamber between said skirt and element and providing an air discharge chamber centrally of said element, having means for discharging air out of the upper portion of said discharge chamber, and having a top and baffle means compelling flow of air downwardly in said air inlet chamber, through said bath where it picks up liquid, upwardly in said uptake chamber and radially inwardly through said filter element; the combination therewith of said skirt extending substantially to the top level of said bath, and a sheet of woven screen of the order of three square meshes per inch each way, said sheet folded in zig-zag corrugations and positioned in said uptake chamber and substantially filling said uptake chamber between said skirt and annular filter element.

3. In a liquid bath filter, an annular filter element comprising spaced annular layers of screen material providing fine interstices of the order of a double sheet of woven screen having sixteen meshes per inch each way and nesting parallel crimps in said double sheet of the order of three thirty-seconds to three-sixteenths inch deep, and a separating layer between said spaced layers of the order of hardware cloth having three meshes per inch each way, said separating layer having parallel crimps of the order of three-thirty-seconds to one-fourth inch deep.

4. The combination of claim 2 wherein said sheet of woven and corrugated screen extends downwardly into said bath, whereby liquid is carried away from said bath more easily where said screen rises upwardly therefrom.

5. In a liquid bath filter comprising an annular filter element and a housing having a liquid bath in the lower portion thereof and having a removable cover closing the top of said housing and having baffle means compelling flow of a gaseous stream through said bath and then through said element; the combination therewith of a cylindrical skirt forming part of said baffle means and secured to said cover and extending substantially to the top level of said liquid bath, an annular slightly resilient layer of stiff coarse mesh screen radially outside of and secured to said annular filter element, said skirt enclosing said layer when said parts are assembled, said screen being provided with corrugations running from top to bottom thereof, and the outside dimension of said layer of coarse mesh screen and the inside dimension of said skirt being so chosen as to provide strong frictional engagement between the outside ridges of said corrugations and said skirt, whereby said filter element is removable from said housing by removal of said cover, and said filter element is removable from said skirt and cover by a strong pull.

6. In a liquid bath filter comprising an annular filter element and a housing having a liquid bath in the lower portion thereof and having a removable cover closing the top of said housing and having baffle means compelling flow of a gaseous stream through said bath and then through said element; the combination therewith of a cylindrical skirt forming part of said baffle means and secured to said cover and extending substantially to the top level of said liquid bath, an annular slightly resilient layer of stiff coarse mesh screen radially outside of and secured to said annular filter element, said skirt enclosing said layer when said parts are assembled, the outside dimension of said layer of coarse mesh screen and the inside dimension of said skirt being so chosen as to provide strong frictional engagement between said layer and said skirt, and said strong frictional engagement providing the sole securing means between said skirt on the one hand and said filter element and layer on the other hand, whereby said filter element is removable from said housing by removal of said cover, and said filter element is removable from said skirt and cover by a strong pull.

7. In a liquid bath filter having a housing for holding a washing liquid bath in the bottom thereof, having a cylindrical outer wall of said housing and a cylindrical skirt spaced inwardly therefrom providing an annular air inlet chamber directing air into said bath, there being air inlet means near the top of said chamber, having an annular filter element spaced inwardly from said skirt providing an annular air uptake chamber between said skirt and element, having means for discharging air out of the upper portion of said discharge chamber, and having a top and baffle means compelling flow of air downwardly in said air inlet chamber, through said bath where it picks up liquid, upwardly in said uptake chamber and radially inwardly through said filter element, the combination therewith of a filamentary oil dispersion element filling said annular uptake chamber and engaging between said skirt and filter element to act as a spacer, and securing means attaching said filter element to said skirt.

JACOB K. BRIXIUS.
ROBERT GORDEN HANNEMAN.

REFERENCES CITED

The following references are of record in the file of this patent:

UNITED STATES PATENTS

| Number | Name | Date |
|---|---|---|
| 1,876,368 | Walton | Sept. 6, 1932 |
| 1,912,235 | Winslow | May 30, 1933 |
| 2,011,303 | Schulz | Aug. 13, 1935 |
| 2,046,093 | Schaaf et al. | June 30, 1936 |
| 2,053,603 | Donaldson | Sept. 8, 1936 |
| 2,150,745 | Mieras et al. | Mar. 14, 1939 |
| 2,151,593 | Glanzer | Mar. 21, 1939 |
| 2,190,683 | Schaaf et al. | Feb. 20, 1940 |
| 2,190,886 | Schaaf et al. | Feb. 20, 1940 |
| 2,341,771 | Hagar | Feb. 15, 1944 |
| 2,354,722 | Walton | Aug. 1, 1944 |
| 2,377,142 | Glanzer | May 29, 1945 |